(12) United States Patent
Lucarelli

(10) Patent No.: US 8,016,064 B2
(45) Date of Patent: Sep. 13, 2011

(54) SNOWMOBILE ASSEMBLY

(76) Inventor: Lance Lucarelli, Bayonne, NJ (US)

( * ) Notice: Subject to any disclaimer, the term of this patent is extended or adjusted under 35 U.S.C. 154(b) by 101 days.

(21) Appl. No.: 12/623,995

(22) Filed: Nov. 23, 2009

(65) Prior Publication Data

US 2011/0120793 A1 May 26, 2011

(51) Int. Cl.
*B62M 27/02* (2006.01)
(52) U.S. Cl. ......................................................... 180/193
(58) Field of Classification Search ................... 180/193, 180/190
See application file for complete search history.

(56) References Cited

U.S. PATENT DOCUMENTS

| | | | | |
|---|---|---|---|---|
| 3,933,213 A * | 1/1976 | Trowbridge | ............... | 180/193 |
| 4,462,480 A * | 7/1984 | Yasui et al. | ................... | 180/193 |
| 5,730,242 A * | 3/1998 | Furusawa | .................... | 180/193 |
| 5,881,834 A * | 3/1999 | Karpik | ......................... | 180/193 |
| 5,904,216 A * | 5/1999 | Furusawa | .................... | 180/193 |
| 6,234,264 B1 * | 5/2001 | Boivin et al. | ................. | 180/193 |
| 6,390,219 B1 * | 5/2002 | Vaisanen | ..................... | 180/193 |
| 6,991,057 B2 * | 1/2006 | Imamura et al. | ............. | 180/193 |
| 7,318,494 B2 * | 1/2008 | Takahiko et al. | ............. | 180/193 |
| 7,322,435 B2 * | 1/2008 | Lillbacka et al. | ............ | 180/193 |

* cited by examiner

*Primary Examiner* — Tony H. Winner
(74) *Attorney, Agent, or Firm* — Jon Fallon, Esq.

(57) ABSTRACT

Embodiments of the present invention relate to an improved snowmobile assembly yielding increased energy absorption in its suspension, improved handling, optimized engine positioning and lower center of gravity. In one embodiment, a rear snowmobile suspension comprises a frame comprising a pair of opposing, longitudinally extending, transversely spaced fixed rails, a pair of rear swing arms pivotably connected on respective first ends to a rear portion of the frame, one on each of a first and a second fixed rail, a front swing arm pivotably connected on a first end to a front portion of the frame on the first fixed rail, and a front drive arm pivotably connected on a first end to a front portion of the frame on the second fixed rail, opposing the front swing arm, wherein the front drive arm houses a portion of the drive assembly for driving the snowmobile.

20 Claims, 12 Drawing Sheets

SNOWMOBILE ASSEMBLY

BACKGROUND OF THE INVENTION

1. Field of the Invention

Embodiments of the present invention generally relate to a snowmobile assembly. More specifically, embodiments of the present invention relate to an improved snowmobile assembly yielding increased energy absorption in its suspension, improved handling, optimized engine positioning and lower center of gravity.

2. Description of the Related Art

Performance characteristics of snowmobiles, including the comfort of the ride, depend upon a variety of systems and components, including the snowmobile suspension design, and the length and weight of the snowmobile. Typically, a snowmobile suspension includes two systems, a front suspension system for the skis and a rear suspension system for the track.

The rear suspension of a snowmobile supports an endless track driven by the snowmobile engine to propel the machine. The track is supported beneath the vehicle chassis by a suspension that is designed to provide a comfortable ride and to help absorb the shock of the snowmobile crossing uneven terrain. Most modern snowmobiles utilize a slide rail suspension which incorporates a pair of slide rails along with several idler wheels to support the track in its configuration and to slide inside the rubber drive belt when the suspension is in a compressed state. The slide rails are generally suspended beneath the chassis by a pair of suspension arms, each arm being attached at its upper end to the tunnel of the snowmobile, and at its lower end to the slide rails. The mechanical linkage of the slide rails to the suspension arms and to the snowmobile chassis typically is provided with springs and one or more shock absorbers inside the rubber track, the springs being loaded to urge the slide rails downwardly away from the snowmobile chassis, and the shocks providing dampening forces for ride comfort.

A variety of configurations of suspension arms, springs, shocks, and shock rods have been utilized to alter the characteristics and feel of the ride given by a particular suspension system. For example, a snowmobile track suspension may have a pair of generally parallel suspension arms connecting the slide rails to the snowmobile chassis. In such a configuration, the lower end of the rear suspension arm has a pivot mount that is movable longitudinally of the frame. When this pivot is located at its forward most portion of longitudinal movement (i.e., at the forward end of a longitudinal slot), the suspension arms form a parallelogram with the snowmobile chassis and the slide rails so that upward movement of the front suspension arm is transmitted through the slide rails to the rear suspension arm, causing the slide rails to move upward in an orientation that is generally parallel to the snowmobile chassis. Thus, the front end of the slide rails cannot move higher than the back end of the slide rails. The longitudinal slot into which the lower end of the rear suspension arm is pivotally mounted, however, permitting the back end of these slide rails to move higher than the front end of the rails. These designs are generally considered to be the reason why current suspension systems produce a comfortable ride as bumps in the terrain are encountered.

In many known systems, the front suspension arm is limited to minimal suspension travel because of a plastic driver fixed in the snowmobiles tunnel, over which the rubber drive track must travel. Thus, the amount of travel for existing snowmobile suspension systems are limited to about 2 to 6 inches for the front suspension arms of true vertical displacement and about 6 to 9 inches for the rear suspension arms of true vertical displacement.

However, while these designs may be sufficient for certain conditions, there are significant limitations which snowmobile riders encounter on a frequent basis, for example, when travelling over moguls or on bumpy terrain. Thus, there is a need for an improved snowmobile suspension capable of increased energy absorption in its suspension, improved handling, optimized engine positioning and lower center of gravity.

SUMMARY OF THE INVENTION

Embodiments of the present invention relate to an improved snowmobile assembly yielding increased energy absorption in its suspension, improved handling, optimized engine positioning and lower center of gravity. As described herein, embodiments of the present invention provide a redesigned drive system fixed rail ("DSFR"), alternatively called a drive system stationary rail ("DSSR"), and a brake system mounted on the fixed rail. Another aspect of certain embodiments of the present invention provides the driver and braking apparatus positioned on the fixed rail allowing for a quick change gear system ("QCS") in an easily accessible gear box.

In accordance with embodiments of the present invention, by moving the driver out of tunnel there is a shorter distance for the rubber drive track yielding less weight and minimized tensioning issues. In addition, shock absorbers may not mounted inside of fixed rail as with a traditional suspension system, allowing enhanced suspension displacement in a compressed state. Furthermore, shorter dimension of the snowmobile and this yields a lighter snowmobile.

With many embodiments of the present invention, by having increased suspension with the front swing arm, there is increased suspension with the rear swing arms, which in turn provides an increased suspension with a front ski suspension system. Additional benefits of embodiments of the present invention provide a unique and optimized engine positioning, gas tank positioning, and ski placement. Furthermore, because of the features of embodiments of the present invention, the overall snowmobile length is shortened, and the steering and handling of the snowmobile is greatly enhanced.

In many embodiments, as described herein, the driver may be relocated onto the fixed rail which then in turn lets the front swing arm have maximum travel of 10 to 20 inches in true vertical displacement, yielding rear suspension true vertical displacements of upwards of 17 to 30 inches. In certain embodiments, the increased suspension of the front and rear swing arms also allows for a ski suspension to have a maximum travel upwards of 12-15 inches of true vertical displacement.

In one embodiment, a rear snowmobile suspension comprises a frame comprising a pair of opposing, longitudinally extending, transversely spaced fixed rails, a pair of rear swing arms pivotably connected on respective first ends to a rear portion of the frame, one on each of a first and a second fixed rail, a front swing arm pivotably connected on a first end to a front portion of the frame on the first fixed rail, and a front drive arm pivotably connected on a first end to a front portion of the frame on the second fixed rail, opposing the front swing arm, wherein the front drive arm houses a portion of the drive assembly for driving the snowmobile.

In another embodiment of the present invention, a rear snowmobile suspension comprises a pair of rear swing arms pivotably connected on respective first ends to a rear portion of a frame, one on each of a first and a second fixed rail, a front swing arm pivotably connected on a first end to a front portion of the frame on the first fixed rail, and a front drive arm housing a pinion shaft and a pair of bevel gears, each on an end of the pinion shaft, pivotably connected on a first end to a front portion of the frame on the second fixed rail, opposing the front swing arm, wherein a first of the pair of bevel gears is in contact with a first end of a drive shaft, and wherein a second of the pair of bevel gears is in contact with an axle.

In yet another embodiment of the present invention, a rear snowmobile suspension comprises a pair of rear swing arms pivotably connected on respective first ends to a rear portion of a frame, one on each of a first and a second fixed rail, a front swing arm pivotably connected on a first end to a front portion of the frame on the first fixed rail, a front drive arm housing a pinion shaft and a pair of bevel gears, each on an end of the pinion shaft, pivotably connected on a first end to a front portion of the frame on the second fixed rail, opposing the front swing arm, a drive shaft having a first end in contact with a first of the pair of bevel gears, and an axle in contact with a second of the pair of bevel gears via a plurality of gears in a gear box, wherein the axle rotates at least a drive sprocket for moving a continuous track of the snowmobile, and wherein the drive shaft extends through a second end of the front swing arm and engages a driven gear adjacent to the front swing arm.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawing. It is to be noted, however, the appended drawing illustrates only typical embodiments of embodiments encompassed within the scope of the present invention, and, therefore, is not to be considered limiting, for the present invention may admit to other equally effective embodiments, wherein.

Figure 1:
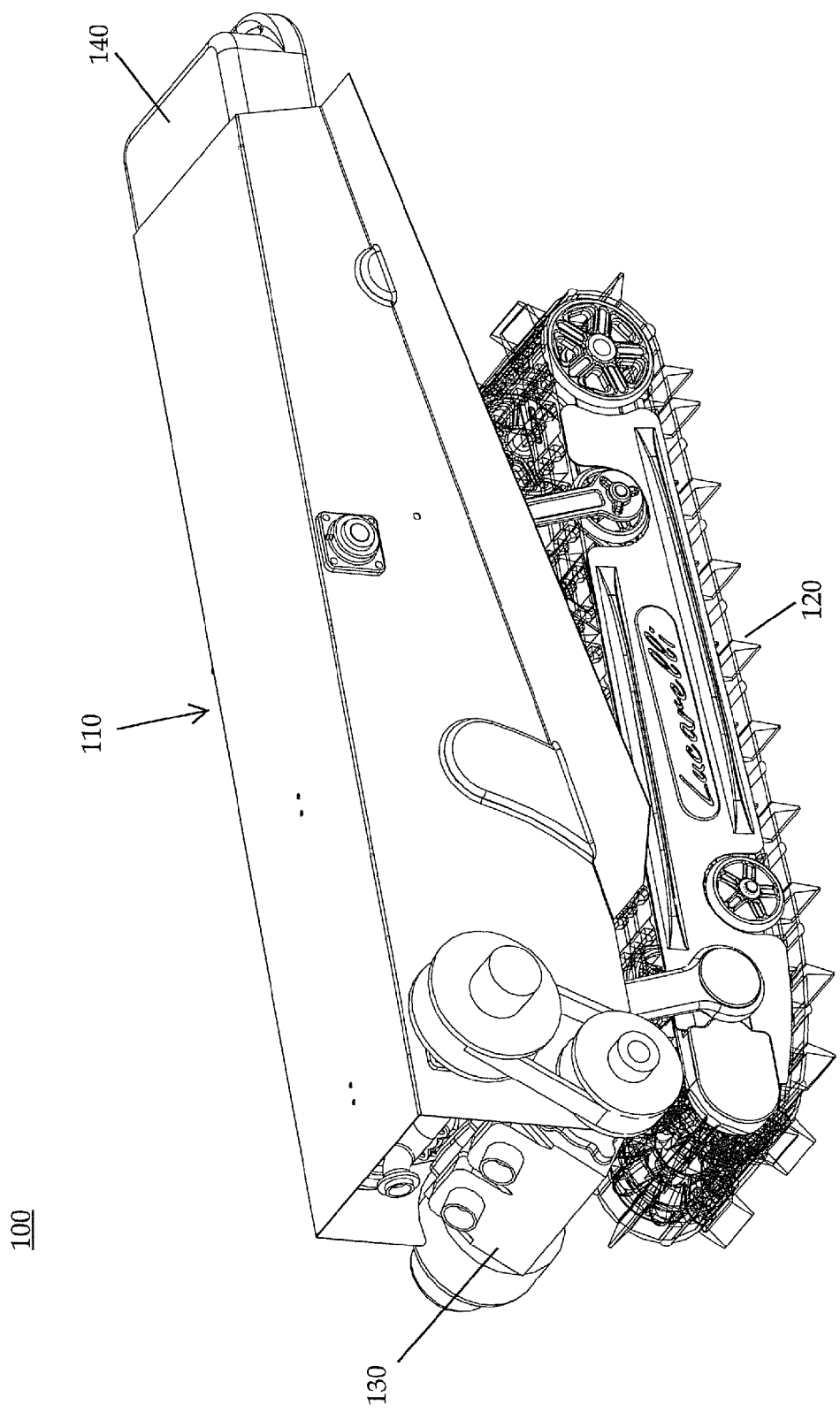
FIG. 1 depicts a perspective view of a middle and rear portion of a snowmobile assembly in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention relate to an improved snowmobile assembly yielding increased energy absorption in its suspension, improved handling, optimized engine positioning and lower center of gravity. FIG. 1 depicts a perspective view of a rear portion of a snowmobile assembly in accordance with one embodiment of the present invention. Generally, the visual middle and rear portion of a snowmobile assembly 100 comprises at least a tunnel 110, a track 120, an engine 130 (and components therewith), and an optional bumper 140. The tunnel 110, or body of the snowmobile, is generally a fiberglass, aluminum or metallic shell, surrounding the internal components of the snowmobile (not shown), which are described in greater detail below. In certain embodiments, the tunnel 110 may comprise a plurality of panels, affixed to various components of the snowmobile, such that certain other components of the snowmobile may extend through the tunnel 110 during operation. The tunnel 110 may also support the seat (not shown), or any other rider accommodating device (e.g., back support, saddle bags, storage compartments, or the like).

Figure 2:
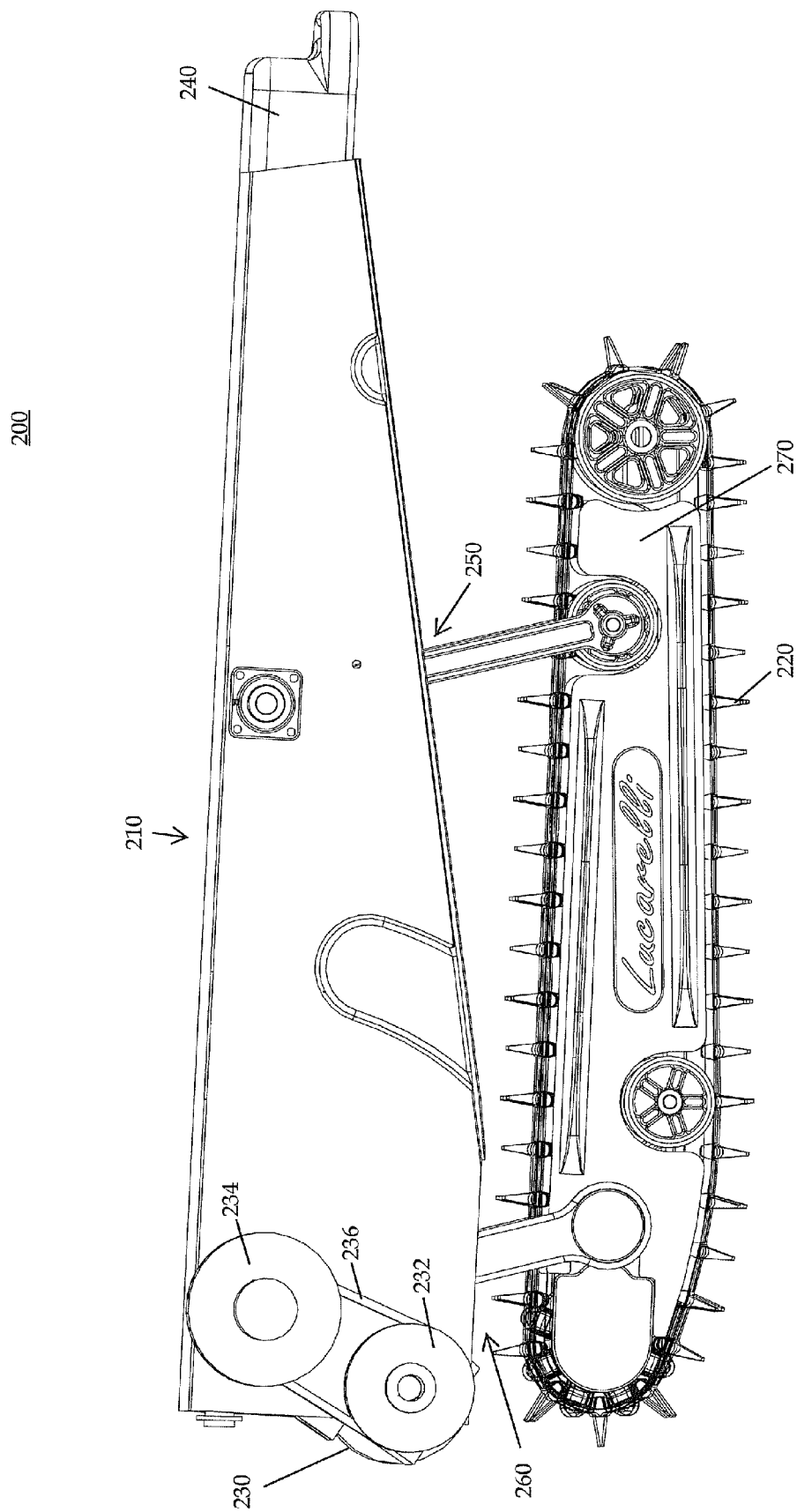
FIG. 2 depicts a side view of a middle and rear portion of a snowmobile assembly in accordance with one embodiment of the present invention.

FIG. 2 depicts a side view of the middle and rear portion of a snowmobile assembly in accordance with one embodiment of the present invention. As shown in FIG. 2, in one embodiment of the present invention, the rear portion of a snowmobile assembly 200 comprises a suspension system, which comprises a front portion of the rear suspension 260 and a rear portion of the rear suspension 250. A more detailed description of the components in the front and rear portions of the rear suspension is discussed infra.

In many embodiments, the rear portion of the snowmobile assembly 200 comprises an engine 230, which in operation rotates a driver pulley 232 via a drive shaft (not shown). The driver pulley 232 transfers rotational energy to a driven pulley 234 via a belt 236, a chain or the like. Embodiments of the present invention further contemplate a more complex clutch assembly associated with the driver pulley 232 and driven pulley 234, as known by those of ordinary skill in the relevant art.

The rear portion of the snowmobile assembly 200 also generally comprises a side cover 270 for protecting the structural components positioned within the track 220, and for preventing snow, water and other debris from entering such area and affecting the speed and handling of the snowmobile.

In accordance with embodiments of the present invention, the engine 230 may comprise any suitable snowmobile engine known in the industry. For example, in certain embodiments, the engine 230 may comprise any type of two-stroke or four-stroke engine, capable of producing anywhere from about 10 hp to about 200 hp of power.

Figure 3:
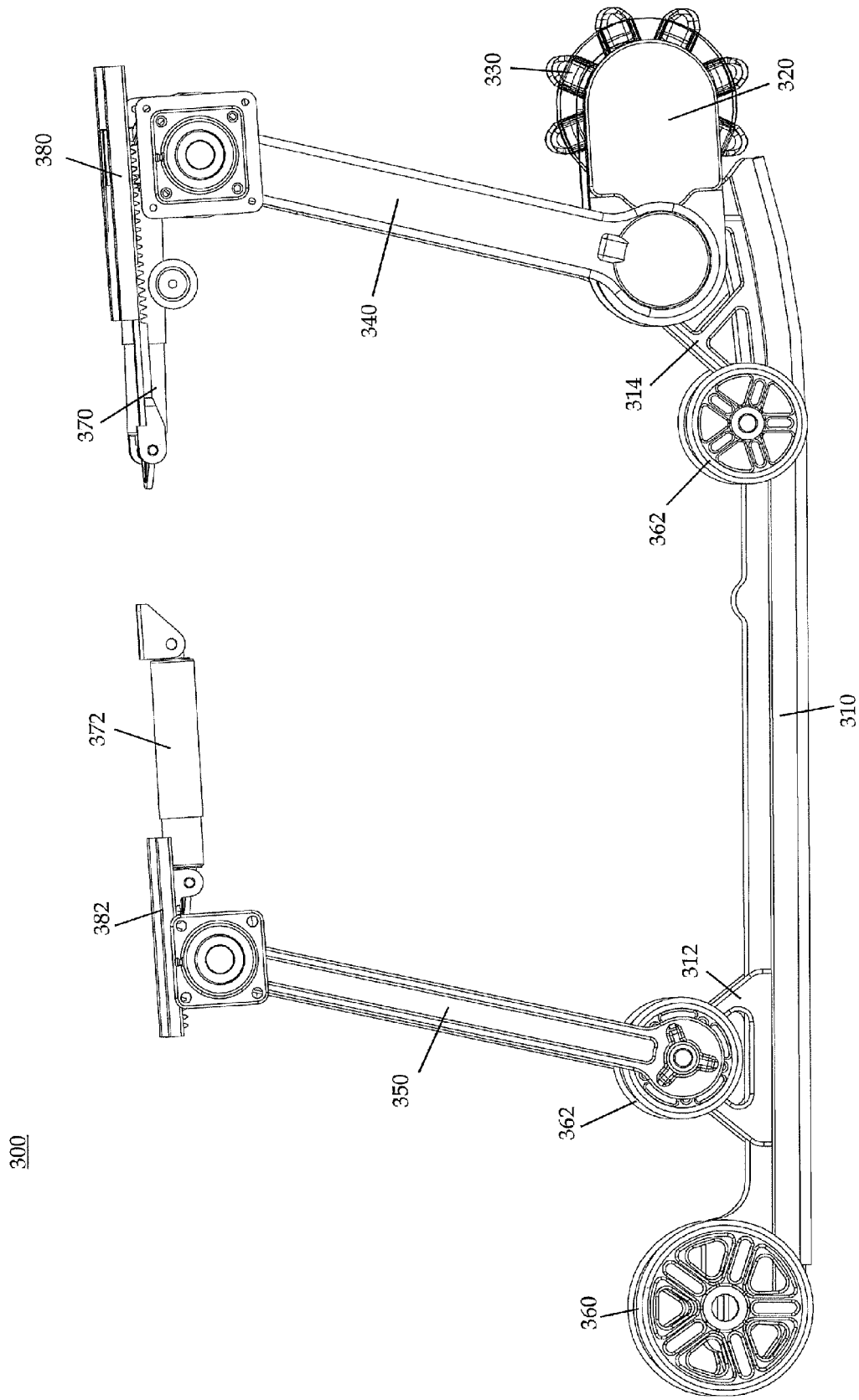
FIG. 3 depicts a side view of a rear suspension system and drive system (DSSR) of a snowmobile assembly in accordance with one embodiment of the present invention.

FIG. 3 depicts a side view of a rear suspension system of a snowmobile assembly in accordance with one embodiment of the present invention. As shown in the depicted embodiment, a rear suspension system of a snowmobile assembly 300 generally comprises a pair of fixed rails 310, a front drive arm 340, a plurality of swing arms 350, a plurality of rack bases 380 for maintaining a proper angle for the shocks 370, and at least a pair of stationary shocks 370. Optionally, a cam arm may be utilized in lieu of the rack bases for achieving a similar result of maintaining proper positioning of the shocks 370. It should be appreciated by embodiments of the present invention, although only one side (the right side) of the rear suspension system 300 is shown in FIG. 3, many of the components of the rear suspension system 300 are balanced such that a equivalent component would be visible from a left side view, as evidenced by other Figures depicted herein.

In many embodiments, the fixed rail 310 acts as a frame for the track (not shown) when the snowmobile is in operation. It should be appreciated by embodiments of the present invention, rather than sliding, as a traditional snowmobile frame, the frame generally exists in a fixed state for supporting fixed rails and guides for the track. In accordance with embodiments of the present invention, the entire frame generally comprises two longitudinally extending transversely spaced apart fixed rails 310 (only one is shown) that are transversely interconnected by suitable cross-structures to form a generally rigid structure. The lower surfaces of the fixed rails 310 are generally coated with a suitable low friction material such as nylon, Teflon®, or an UHMW (ultra high molecular weight polymer), for sliding contact with the track. Alternatively, removable hyfaxes may be utilized for providing the low friction on the surface of the fixed rails 310.

Generally, additional components, such as the rear side frame 312 and the drive side frame 314 are mounted to the fixed rail 310, and further support components of the rear suspension system. In some embodiments, these additional components may be machined therewith, if manufactured as a single assembly. Similarly, the fixed rail 310 may support a plurality of bogie wheels 360, 362, which act to support the track about the fixed rail 310. In some embodiments, the rear bogie wheel 360 is between about 6 to 10 inches in diameter to adequately support the track, and in one exemplary embodiment, the rear bogie wheel 360 is approximately 8 inches in diameter.

The bogie wheels 362 are generally positioned toward the center of the fixed rails, such that they act as a middle support for the track. In some embodiments, the bogie wheels 362 are between about 3 to 7 inches in diameter, and in one exemplary embodiment, the bogie wheels 362 are approximately 5½ inches in diameter. In some embodiments, tension of the track is kept by the rear bogie wheels 360, capable of adjusting the tension in the track, for example, by adjusting bolts on each side of the rail which can allow the bogie wheel 360 to move back and forth for tightening and loosening the drive track. Optionally, the bogie wheels 362 may be spring, hydraulic, or similarly biased when supporting the track. In such an embodiment, the bogie wheels 362 are capable of maintaining adequate tension on the track at all times.

As shown in FIG. 3, at the rear of the rear suspension system 300, a bogie wheel 362 is supported at the rear side frame 312 at an axis along with a first end of a pivotably connected swing arm 350. In alternative embodiments, the swing arm 350 may be pivotably connected to a different portion of the rear side frame 312, either directly to the frame itself, on a frame extension (e.g., a vertically extruded member or bar from the frame), or from a rear bogie wheel 360.

The swing arm 350 is generally a rigid member, having a length sufficient for embodiments of the present invention. In a substantially vertical position, the swing arm 350 may define the height of the overall snowmobile, as the fixed rails 310, the rear side frame 312, the tunnel and other components directly or indirectly fixed to the swing arm 350 are fairly industry standard in size. In addition to defining the height, the swing arm 350 may also define the amount of suspension travel of the snowmobile suspension as a whole. As such, in certain embodiments of the present invention, the swing arm 350 ranges from between about 12 inches to about 40 inches in length (from axis to axis), and in one exemplary embodiment is approximately between about 24 inches in length. In other embodiments, the front swing arm 360 may be about 20 inches in length, and the rear swing arm may be about 24 inches in length.

In many embodiments of the present invention, each rear snowmobile suspension 300 comprises at least two rear swing arms 350, and a front swing arm (not shown). In such embodiments, the other front arm is a drive arm 340. The drive arm 340 is substantially similar to at least the front swing arm 350 in length. The drive arm 340 is characterized, however, by its positioning with respect to the drive shaft (not shown), and its housing of a pinion shaft (not shown) for transferring rotational power from the engine to the QCS (not shown) and drive sprockets 330 which provide rotational power to, and drive the track. More details on the driving mechanism of embodiments of the present invention are disclosed below.

In accordance with many embodiments, on a second end of both the swing arm 350 and the drive arm 340 are rack bases 382 and 380, respectively. The rack bases 380 and 382 are affixed to the tunnel when the snowmobile is in operation to maintain proper positioning of the shocks 370. The rack bases 380 and 382 generally comprise the rack portion of a rack and pinion-type assembly, and are capable of allowing the rear suspension system 300 to compress where necessary, without unnecessary resistance from the tunnel, the weight of the rider, or the like.

In most embodiments, a plurality of shocks 370 and 372 are also provided within the rear suspension system 300. As shown in the embodiment of FIG. 3, a front stationary shock 370 and rear stationary shock 372 may be provided. The front stationary shock 370 is generally affixed to a front portion of the rear suspension system on a first end, and is affixed to an inner or outer surface of the tunnel on a second end. Conversely, the rear stationary shock 372 is generally affixed to the tunnel on a first end, and to a rear portion of the rear suspension system on a second end.

Each of the shocks may comprise any type of shock absorber suitable for embodiments of the present invention. In many embodiments, the shocks 370 and 372 may comprise any one of an liquid-based shock absorber, such as an emulsion shock absorber, an internal reservoir shock absorber, or an external reservoir shock absorber; a spring-based shock absorber, such as a coil-over piston-damper shock absorber, piston-dampers over torsion-spring shock absorber; traditional air shocks (e.g., Fox FLOAT® AirShox, commercially available from Fox Racing Shox of Watsonville, Calif.); or the like. The shocks 370 and 372 may comprise any length, compression distance, and resistance, suitable for embodiments of the present invention.

Figure 4:
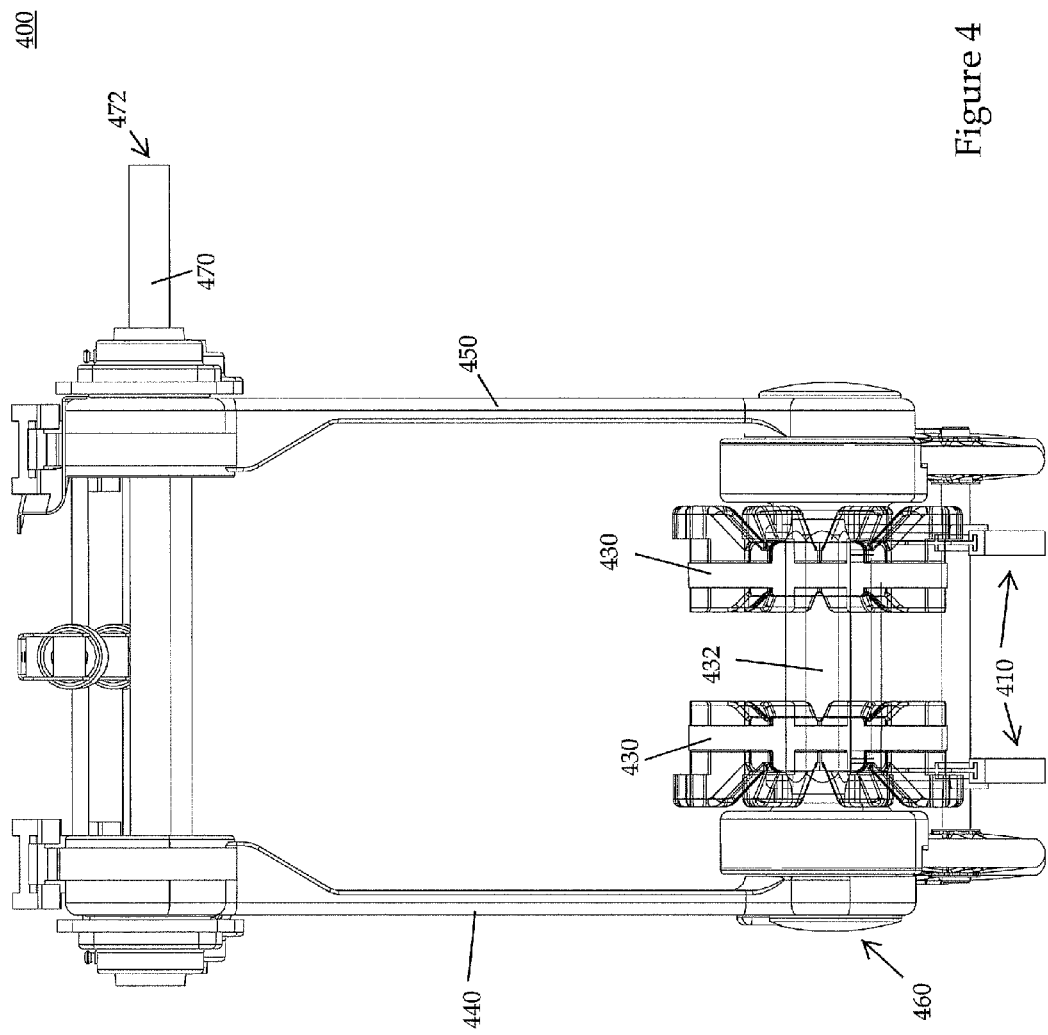
FIG. 4 depicts a front view of a rear suspension system and drive system (DSSR) of a snowmobile assembly in accordance with one embodiment of the present invention.

FIG. 4 depicts a front view of a suspension system of a snowmobile assembly in accordance with one embodiment of the present invention. As depicted in the Figure, a plurality of fixed rail guides 410 protrude along the underside of the rear suspension system 400 for further supporting the track in operation. Similar to the fixed rails, discussed supra, the fixed rail guides 410 may be coated in one of any number of low friction materials to assist in allowing the track to travel about the fixed rails with minimal friction and/or interference. In certain embodiments, the fixed rail guides 410 may comprise removable hyfaxes, as known in the industry.

The drive sprockets 430 are substantially profiled wheels having a plurality of teeth for meshing with the track. In many embodiments, the drive sprockets 430 are primarily responsible for driving the track. The drive sprockets 430 may comprise any size, shape or material suitable for embodiments of the present invention. In some embodiments, the drive sprockets 430 are between about 6 to about 10 inches in diameter, and in one exemplary embodiments are about 8 inches in diameter.

In one embodiment, the drive sprockets 430 comprise a plurality of finger-like projections extending outwardly therefrom, for engaging the slots of a track. Working together with an opposing side of the driver, which grabs lugs extending upward from the track, dual driving contact is made with the track.

Each of the drive sprockets 430 are mounted on a sprocket axle 432. The sprocket axle 432 is generally connected with a driving gear (not shown) inside the gear box 460 on a first end where it receives rotational energy to drive the track. In many embodiments, the sprocket axle 432 comprises a substantially non-circular cross-section, for example, a hexagonal, triangular or rectangular cross-section, in order to minimize or eliminate slip between the sprocket axle 432 and the drive sprockets 430 when in operation.

In many embodiments, the swing arm 450 and the drive arm 440 are both rotatably connected about a drive shaft 470, which connects with each of the second ends of the swing arm 450 and drive arm 440. The drive shaft 470 has a first end 472 which generally supports the driven pulley (not shown), discussed above. As the driven pulley is rotated via a belt from the driver pulley, the drive shaft 470 rotates therewith. A more detailed description of the second end of the drive shaft 470, and its intersection with the drive arm 440 is disclosed below with reference to FIG. 12.

Figure 5:
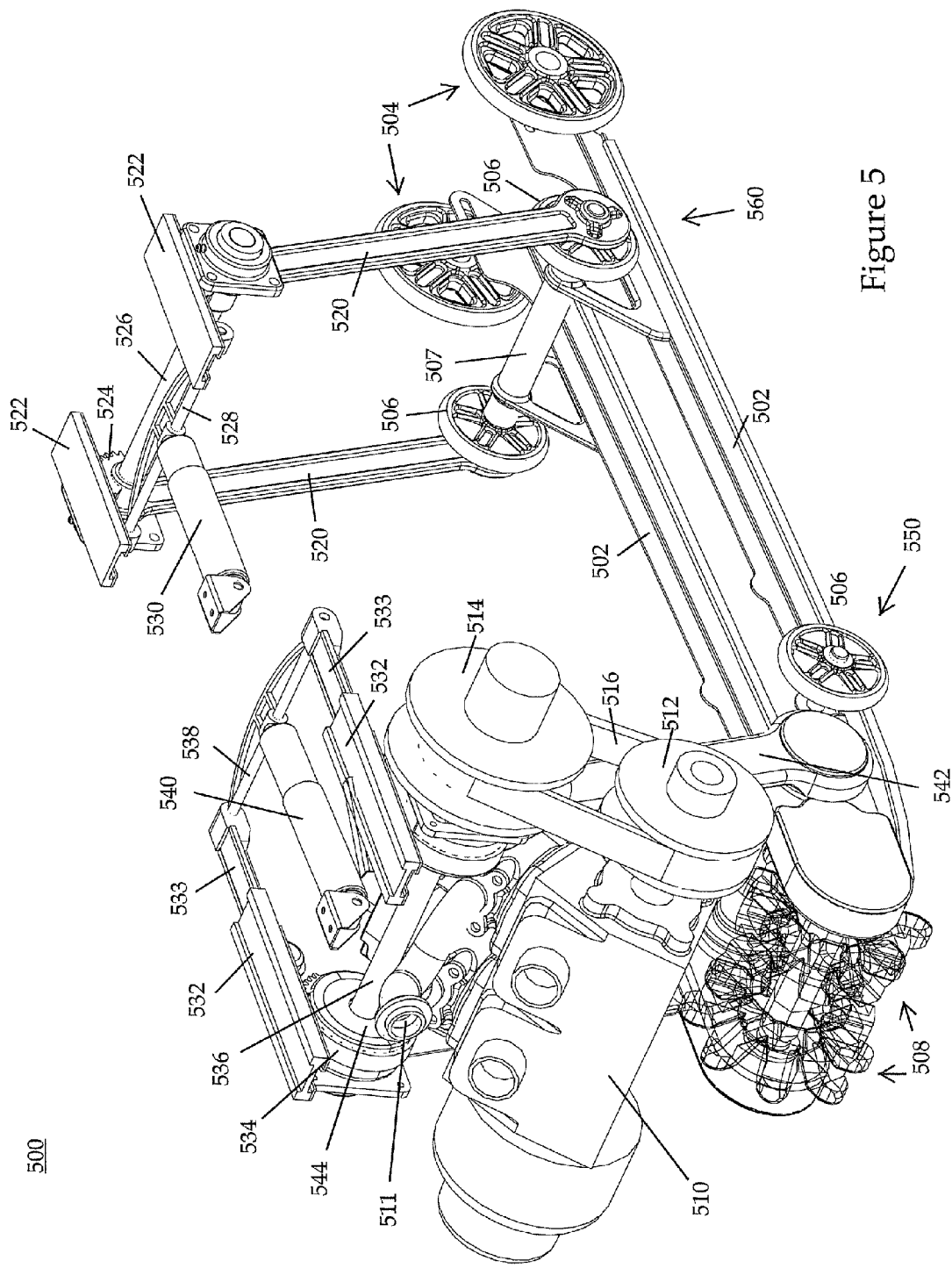
FIG. 5 depicts a perspective view of a motor, a pulley system, shock absorbers, and a DSSR system in a full-sprung travel position of a snowmobile assembly in accordance with one embodiment of the present invention.

FIG. 5 depicts a perspective view of a middle and rear portion of a snowmobile assembly in accordance with one exemplary embodiment of the present invention. The rear portion of the snowmobile assembly 500 generally comprises many of the components discussed hereinabove, having a tunnel, bumper and track removed for convenience of viewing. As assembled, the rear portion of the snowmobile assembly 500 can be described in view of a front section 550 and a rear section 560, defined by opposing ends of the fixed rails 502.

The rear section 560 comprises a pair of track-adjusting rear bogie wheels 504, one on the end of each fixed rail 502. A rear side frame 507, or connecting pipe, connects the two fixed rails 502 and supports a bogie wheel shaft (not shown) passing therethrough. The bogie wheel shaft supports a pair of bogie wheels 506 about a rotatable axis, and its respective ends are rotatably connected to a first end of the rear swing arms 520.

A second end of the rear swing arms 520 are rotatably connected about a swing arm shaft 526. A rack base 522 and associated spur gear 524 are positioned adjacent the second ends of the swing arms 520, with the spur gear 524 being affixed to the swing arm shaft 526. Each rack base 522 may also be used to support opposing ends of a shock slide bar 528 via a spur rack (not shown), which attaches to the second end of a rear shock 530.

The front section 550 comprises a pair of drive sprockets 508 positioned at the end of the fixed rails 502, positioned about a sprocket axle. The front section 550 further comprises opposing bogie wheels 506 (only one shown), supported on a bogie wheel shaft (not shown). An engine 510, having an exhaust header 511, among other components, is positioned with the front section 550 of the rear portion of the snowmobile assembly 500. The engine 510 drives a driver pulley 512, which in turn rotates a driven pulley 514 via a belt 516.

As shown, the driven pulley 514 is affixed about a drive shaft 536, which passes through a second end of a front swing arm 542. The drive shaft 536 is secured on a distal end by the drive arm 544, which may generally connect with the drive shaft 536 via a bevel gear (not shown), or similar apparatus for changing the direction of the rotational axis at an intersection of mechanical shafts. In an alternative embodiment, the driver pulley 512 may bypass the drive shaft 536, and directly connect with components within the drive arm 544 via a bevel gear. A further description of the drive arm 544 and its components can be found below.

Similar to the rear section 560, a rack base 532 and associated spur gear 534 are positioned adjacent the second ends of the front swing arms 542 and the drive arm 544, with the spur gear 524 being positioned about the drive shaft 536. Each rack base 532 may also be used to support opposing ends of a shock bar 538 via a spur rack 533, which supports the second end of a front shock 540.

Figure 6:
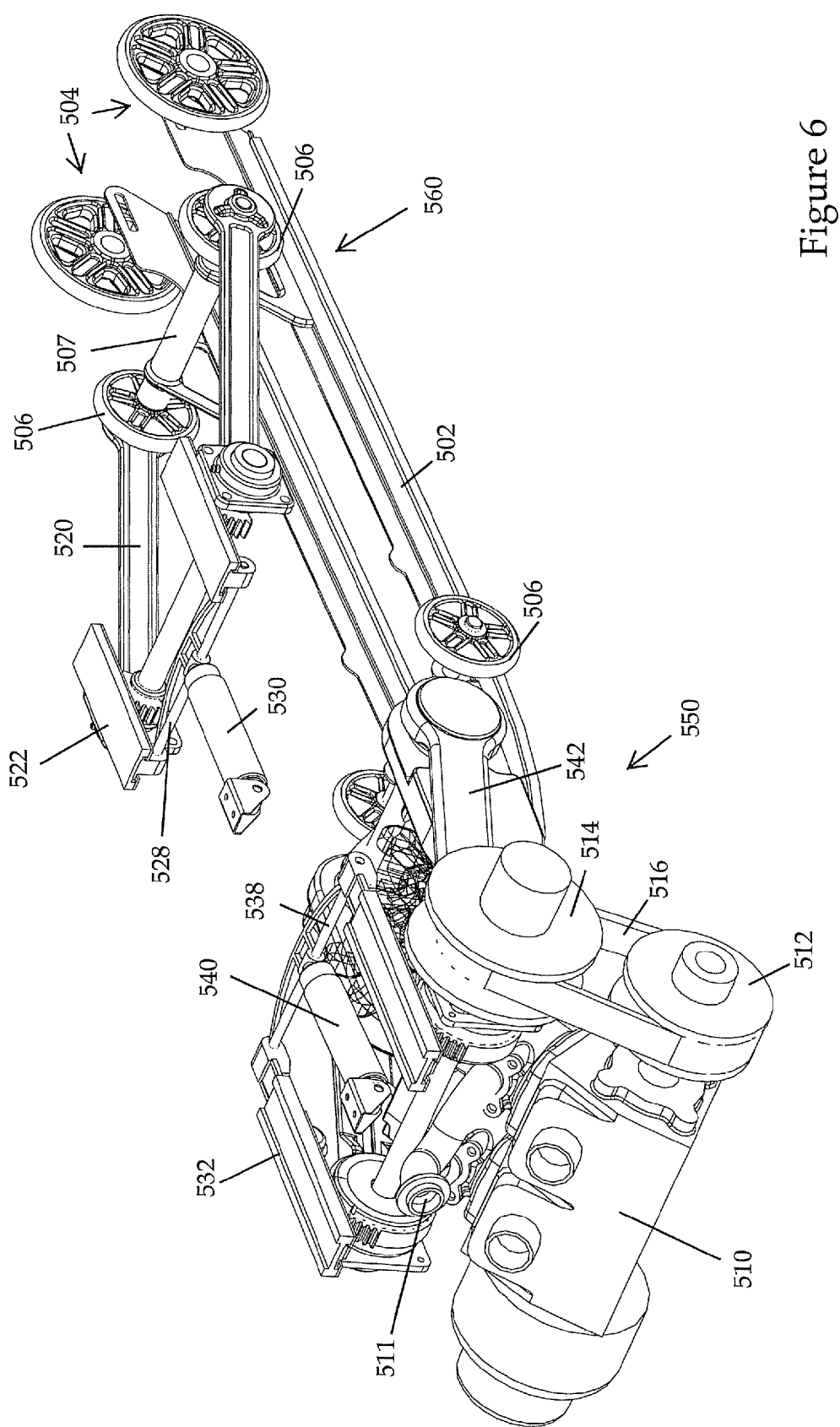
FIG. 6 depicts a perspective view of the system of FIG. 5 in a compressed position, in accordance with one embodiment of the present invention.

FIG. 6 depicts a perspective view of the rear portion of the snowmobile assembly of FIG. 5 in a compressed position, in accordance with one embodiment of the present invention. When in operation, the snowmobile may receive significant impact forces from the weight of the rider, the weight of the snowmobile components and the inertial forces exerted on the snowmobile from a rapid acceleration change. A common example of such significant forces is during a snowmobile run on moguls or bumpy terrain, or when performing freestyle stunts.

When significant forces are exerted on the snowmobile, particularly from either the ground or from the rider's seat (i.e., on the tunnel), the snowmobile's suspension system may be required to compress and absorb a significant portion of the increased energy exerted on the snowmobile. As shown in FIG. 6, in accordance with one exemplary embodiment of the present invention, when the resistive force of the shocks 530 and 540 have reached their threshold, the rear suspension system allows for the swing arms 520 and 542, as well as the drive arm 544 (which for suspension purposes, acts as a swing arm) to rotate forward, and effectively compress the frame of the rear suspension.

As the angle of rotation of the swing arms 520 and 542, and drive arm 544, approaches zero, the overall height of the snowmobile decreases. As shown in FIG. 6, the change in height of the snowmobile may effectually be measured between the top of the rack base 522 to the bottom of the fixed rail 502, and compared to the same measurement when in an upright position. Depending on the type of shocks 530 and 540 used, in many embodiments, the resistance of the shocks 530 and 540 increase as the piston of each shock is compressed further and further, thus absorbing more energy. In certain embodiments of the present invention, however, it is contemplated that the angle of rotation of each swing arm 520 and 542, and drive arm 544, may range between about 90 degrees in an upright position, to about zero degrees when collapsed. In many embodiments, however, the lower range of the angle of rotation may be approximately 0 degrees, in view of structural obstructions that may exist.

Snowmobiles utilizing embodiments of the present invention may be capable of achieving significant energy absorption through combinations of the structural design herein, that is, the swing arm and drive arm length, and use of appropriate shocks. For example, in certain embodiments of the present invention, the rear suspension system may be capable of obtaining up to about 20 inches of front vertical displacement and up to about 30 inches of rear vertical displacement.

Figure 7:
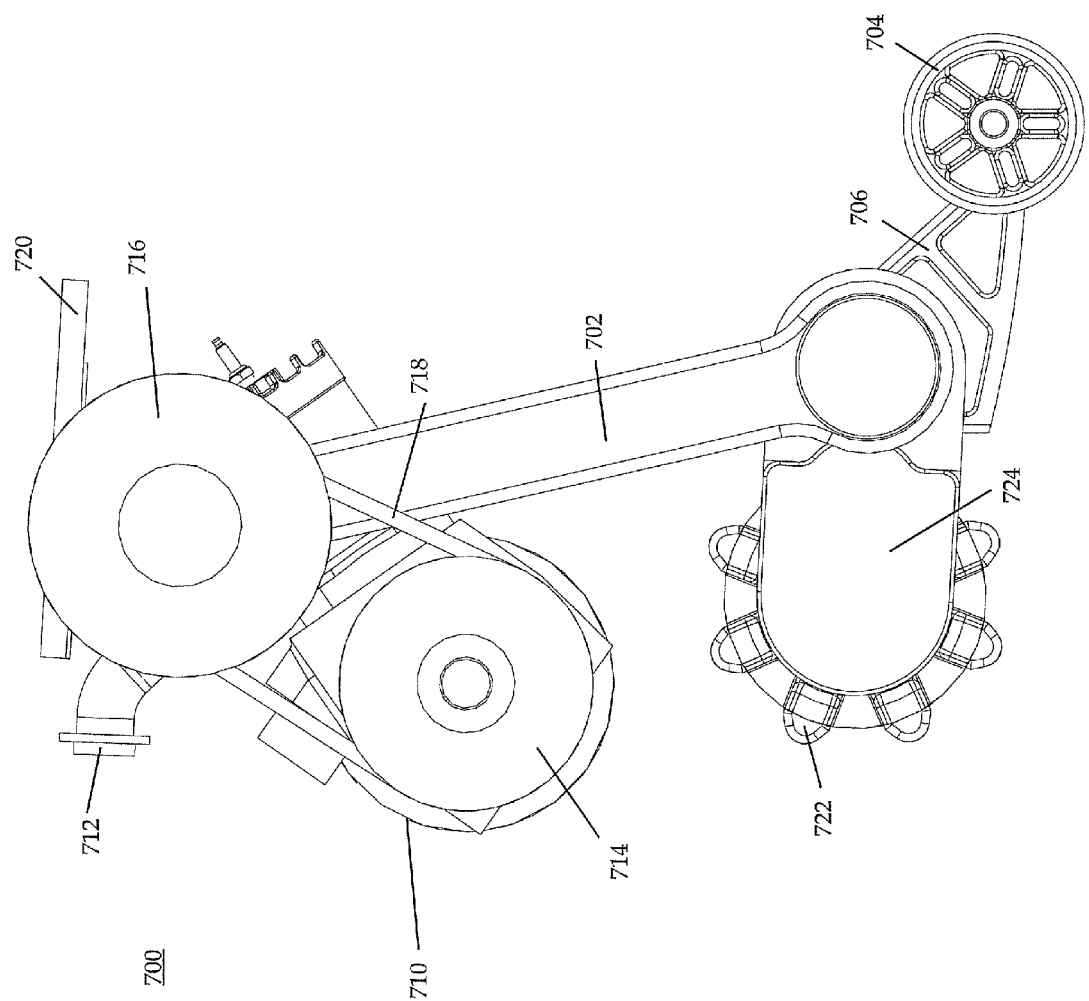
FIG. 7 depicts a side view of the front portion of a rear suspension system and QCS of a snowmobile assembly in accordance with one embodiment of the present invention.

FIG. 7 depicts a side view of the front section of a DSSR of a snowmobile assembly in accordance with one embodiment of the present invention. As shown in FIG. 7, the front portion 700 generally comprises a front swing arm 702, a bogie wheel 704, a front side frame 706 and an engine 710, as shown, having an exhaust header 712. As discussed hereinabove, the front section may further comprise a rack base 720 and components of the drive assembly, namely the driver pulley 714, the driven pulley 716, belt 718, and the drive sprockets 722. The front section 700 additionally comprises a gear box 724, having a cover thereon.

Figure 8:
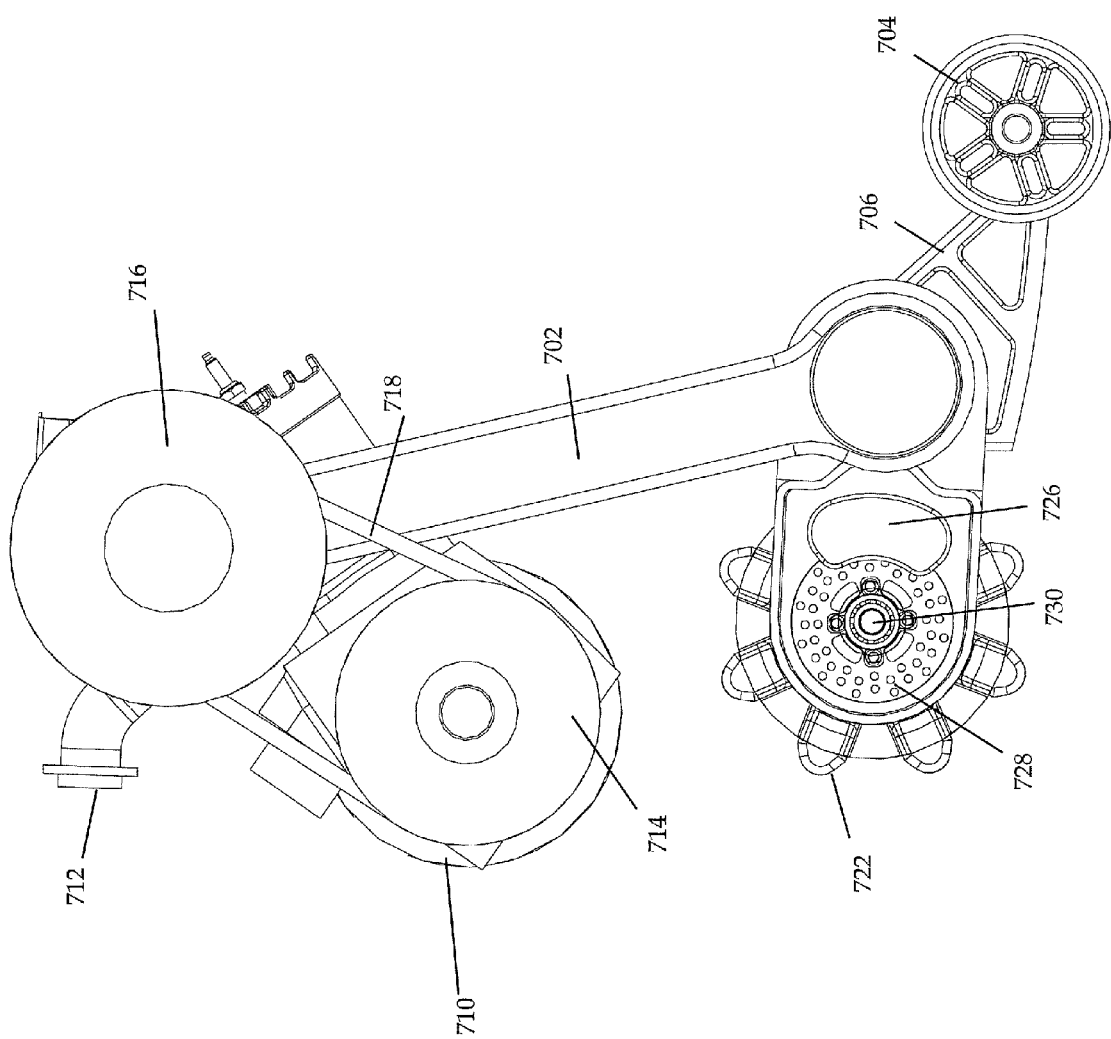
FIG. 8 depicts a side view of the front portion of the rear suspension system of the snowmobile assembly of FIG. 7, having a gear box cover removed and displaying rotor and caliper components, in accordance with one embodiment of the present invention.

FIG. 8 depicts a side view of the front portion of the rear suspension system of the snowmobile assembly of FIG. 7, having a gear box cover removed and displaying rotor and caliper components, in accordance with one embodiment of the present invention. When the cover of the gear box 724 is removed, the braking components of embodiments of the present invention may be revealed. In one embodiment of the present invention, the sprocket axle 730 which provides rotational energy to the drive sprockets 722 may be slowed or stopped by using a caliper 726 and rotor 728 brake assembly, commonly known as a disc brake.

The rotor 728 may comprise any suitable material for embodiments of the present invention. For example, the rotor may comprise any iron or ceramic composite (e.g., carbon, Kevlar and silica composites). The caliper (which may generally comprise a brake pad as well) may be controlled by any means suitable for embodiments of the present invention, including, but not limited to mechanically, hydraulically, pneumatically or electromagnetically, in order to cause friction against the rotor 728 and slow and/or stop the rotation of the sprocket axle 730.

Figure 9:
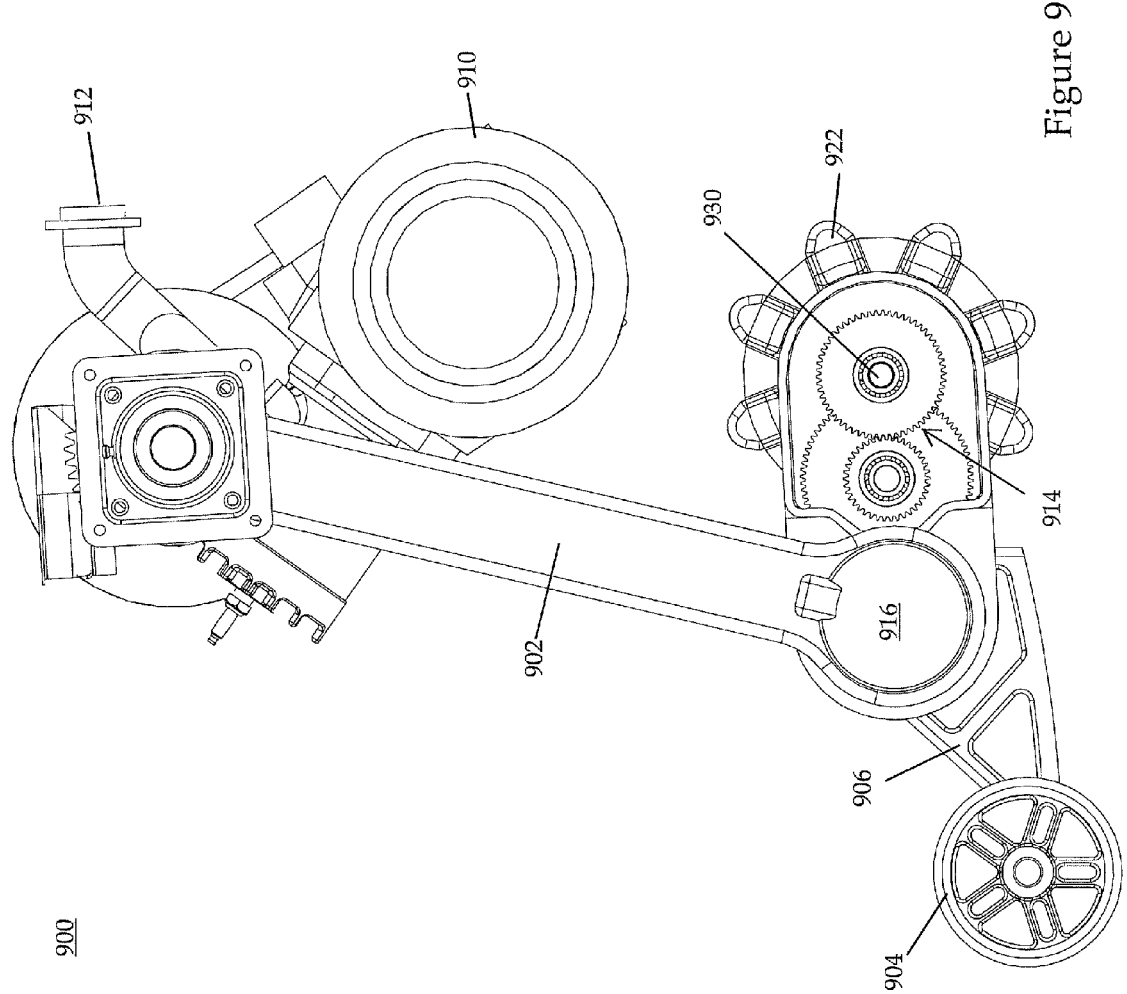
FIG. 9 depicts a side view of the front portion of a rear suspension system of a snowmobile assembly, having a gear box cover removed and displaying a QCS, in accordance with one embodiment of the present invention.
Figure 10:
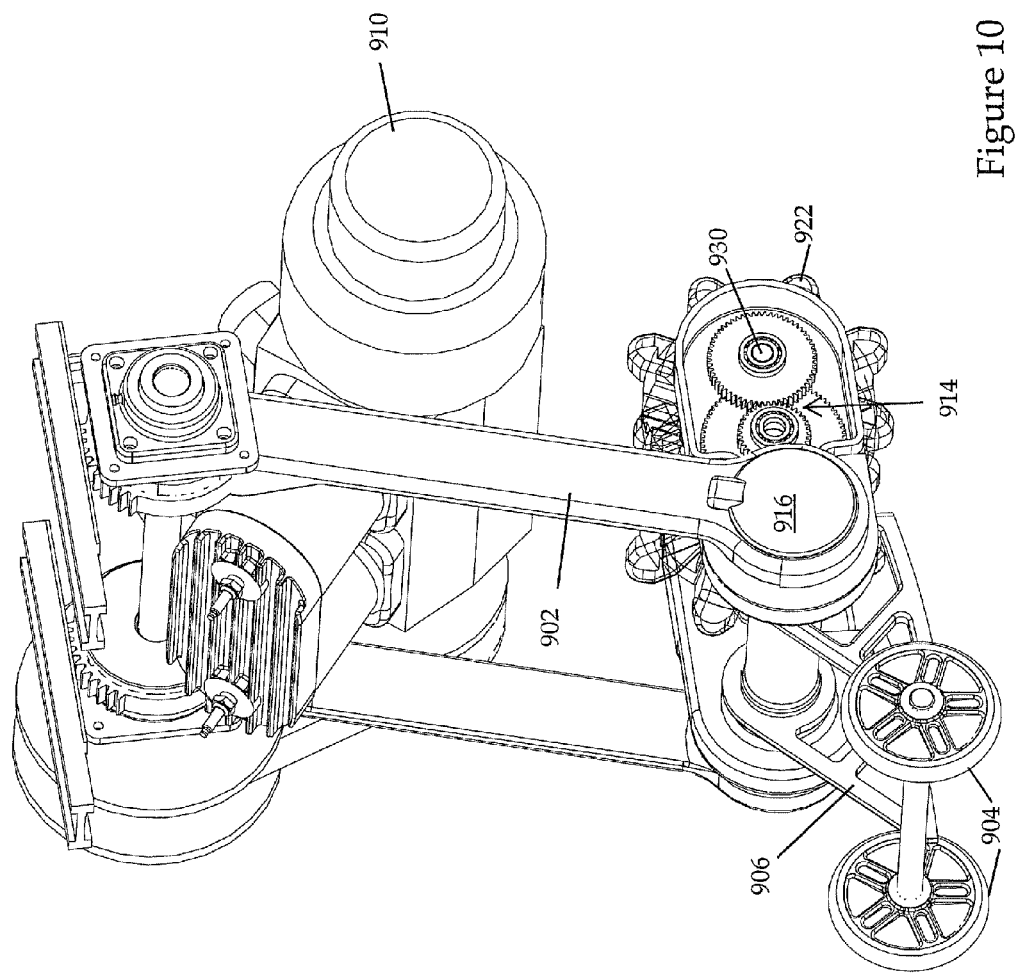
FIG. 10 depicts a perspective view of the front portion of the rear suspension system of the snowmobile assembly of FIG. 9, in accordance with one embodiment of the present invention.

FIG. 9 depicts a side view of the front portion of a rear suspension system of a snowmobile assembly, having a gear box cover removed and displaying a gear assembly, in accordance with one embodiment of the present invention. FIG. 10 depicts a perspective view of the front portion of the rear suspension system of the snowmobile assembly of FIG. 9, in accordance with one embodiment of the present invention. As compared to FIGS. 7 and 8, FIGS. 9 and 10 depict an opposing side of the front portion.

The front portion 900 generally comprises a drive arm 902, a bogie wheel 904, a front side frame 906 and an engine 910, as shown, having an exhaust header 912. The front section may further comprise certain components of the drive assembly, namely the drive sprockets 922, the sprocket axle 930 and a gear train 914.

The gear train 914 begins with a first gear, generally positioned behind cover 916 of the drive arm 902. In many embodiments the first gear comprises a bevel gear driven by a shaft (not shown) within the drive arm 902. The gear train 914 generally comprises any number of gears, inclusive of the first gear, desired to operate the snowmobile in a particular manner. The gear train 914 may yield any gear ratio suitable for embodiments of the present invention.

Figure 11:
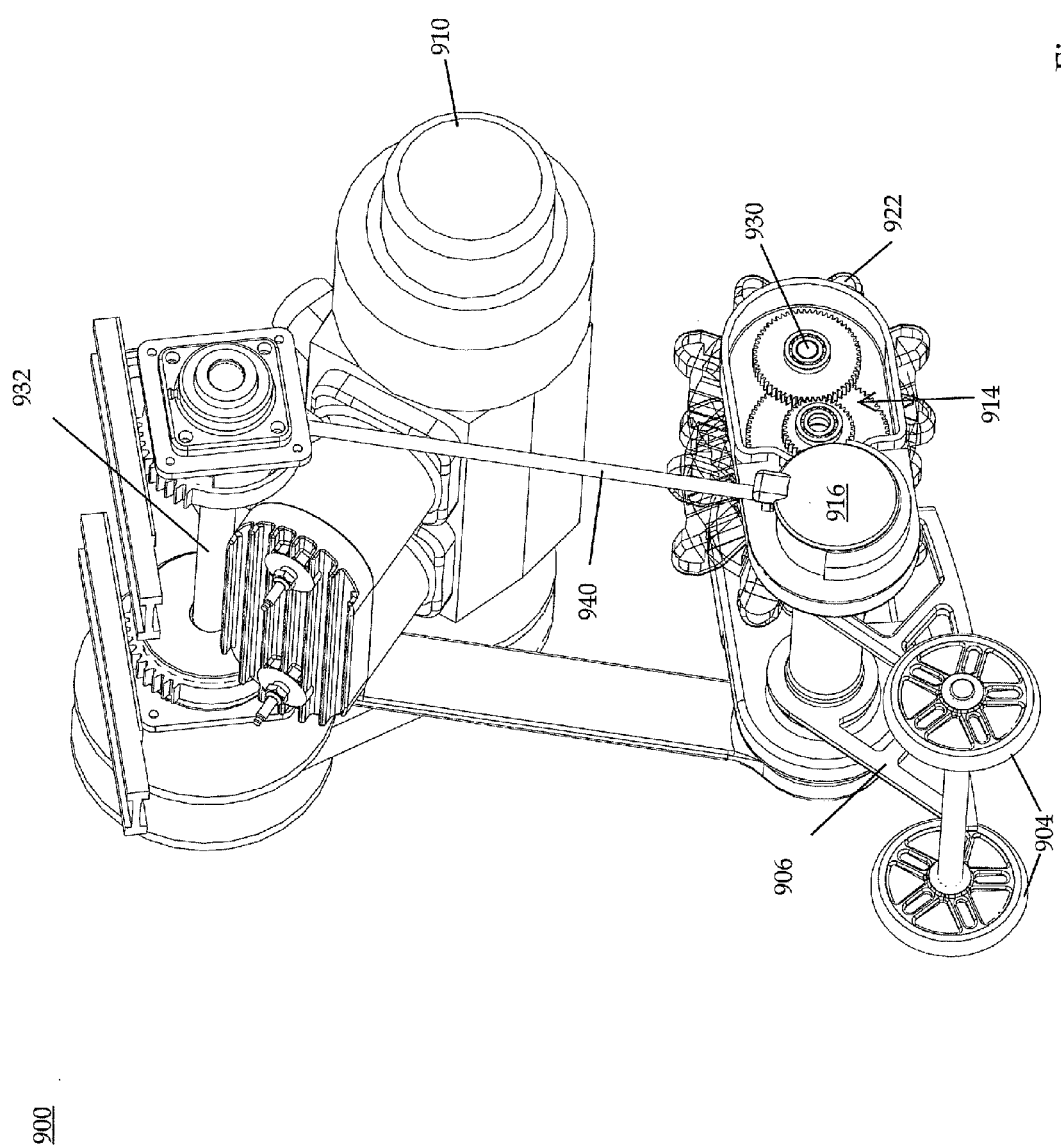
FIG. 11 depicts a perspective view of the front portion of the suspension system of the snowmobile assembly of FIG. 10, having a drive arm removed to display a pinion shaft, in accordance with one embodiment of the present invention.

FIG. 11 depicts a perspective view of the front portion of the suspension system of the snowmobile assembly of FIG. 10, having the drive arm removed to display a pinion shaft, in accordance with one embodiment of the present invention. With the drive arm 902 removed, the pinion shaft 940, which is generally housed either within or adjacent to the drive arm 902, is exposed. The pinion shaft 940 is generally positioned between two bevel gears on each end. As such, the pinion shaft 940 is capable of taking rotational motion from the drive shaft 932 and transferring it to the gear train 914, which in turn rotates the sprocket axle 930.

Figure 12:
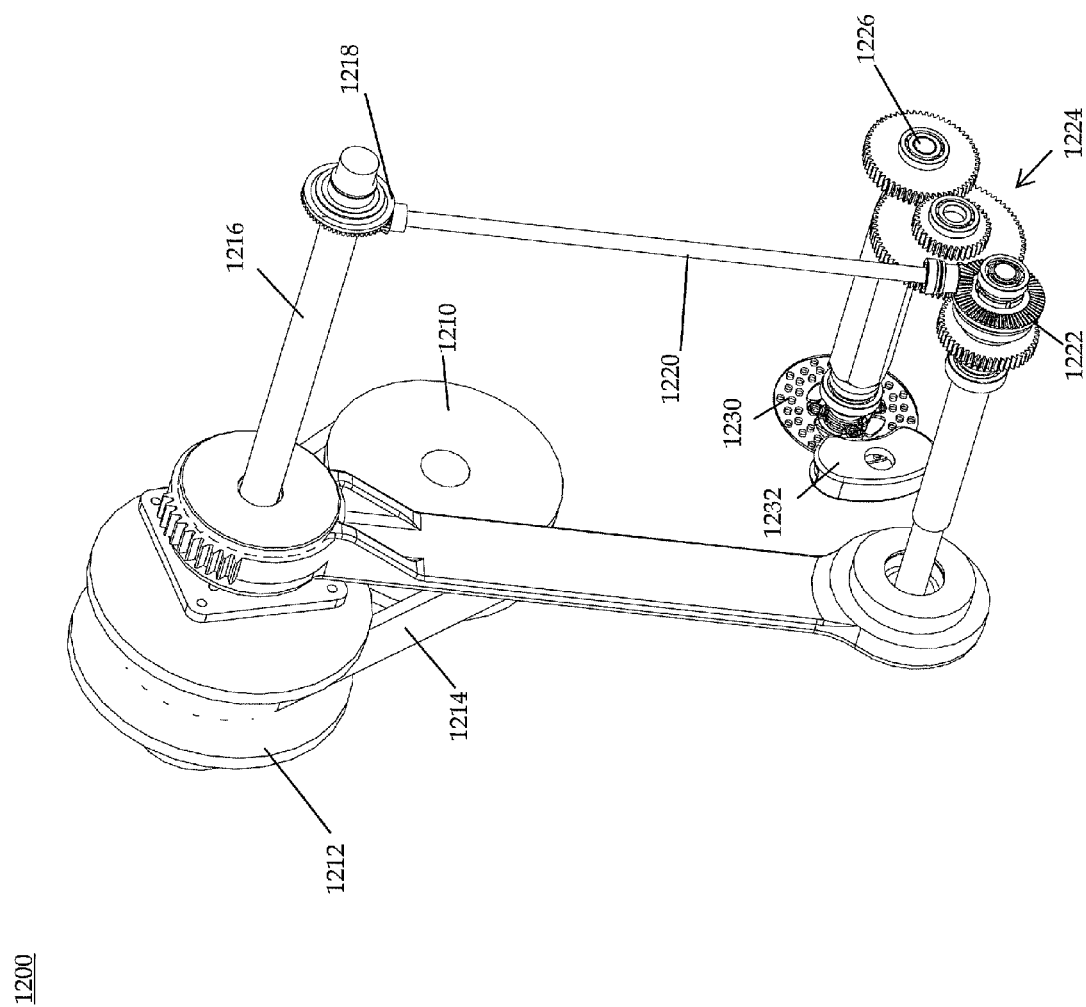
FIG. 12 depicts a perspective view of a portion of the drive assembly, in accordance with one embodiment of the present invention.

FIG. 12 depicts a perspective view of a drive assembly in accordance with one embodiment of the present invention. As shown in the Figure, the drive assembly 1200 comprises a driver pulley 1210, driving the driven pulley 1212 via a belt 124. The drive assembly 1200 further comprises a drive shaft 1216 being rotated by the driven pulley 1212 on a first end, and engaged with a bevel gear 1218 on a second end. The bevel gear 1218 imparts rotational motion on the pinion shaft 1220, which provides rotational energy to the gear train 1224 via a second bevel gear 1222. In accordance with embodiments of the present invention, the gear train 1224, which is commonly housed in the quick change gear box (not shown), powers the sprocket axle 1228 which provides rotational energy to the drive sprockets (not shown).

In order to slow or stop the snowmobile while in motion, a brake assembly is provided on a distal end of the sprocket axle 1228. In one embodiment of the present invention, the brake assembly comprises a rotor 1230 and caliper 1232 assembly, commonly known as a disc brake. Similar to the gear train 1224, the brake assembly may commonly be housed in a gear box (not shown) to provide quick access for maintenance.

While the foregoing is directed to embodiments of the present invention, other and further embodiments of the invention may be devised without departing from the basic scope thereof. It should be appreciated that certain basic components of exemplary embodiments described herein have been left out of the above disclosure for sake of convenience. Such basic components (e.g., bolts, gaskets, bearings, etc.) would be readily apparent to those of ordinary skill in the art, and the exemplary embodiments described herein would likely require many of such components to be suitable commercial embodiments in the relevant marketplace. As such, embodiments of the present invention should be considered in their entirety, inclusive of such components, as known to one of ordinary skill in the art.

What is claimed is:

1. A rear snowmobile suspension comprising:
    a frame comprising a pair of opposing, longitudinally extending, transversely spaced fixed rails;
    a pair of rear swing arms pivotably connected on respective first ends to a rear portion of the frame, one on each of a first and a second fixed rail;
    a front swing arm pivotably connected on a first end to a front portion of the frame on the first fixed rail; and
    a front drive arm pivotably connected on a first end to a front portion of the frame on the second fixed rail, opposing the front swing arm;
    wherein the front drive arm houses a portion of a drive assembly for driving the snowmobile.

2. The rear snowmobile suspension of claim 1, further comprising a drive shaft extending through a second end of the front swing arm and engaged with the portion of the drive assembly housed within the front drive arm.

3. The rear snowmobile suspension of claim 2, further comprising a driven gear on an end of the drive shaft, adjacent to the front swing arm.

4. The rear snowmobile suspension of claim 3, further comprising an engine having a driver gear, wherein the driver gear transfers rotational energy to the driven gear via a belt.

5. The rear snowmobile suspension of claim 4, wherein the engine is moveably connected to at least a portion of the rear snowmobile suspension.

6. The rear snowmobile suspension of claim 1, wherein the portion of the drive assembly comprises a pinion shaft and a pair of bevel gears, each on an end of the pinion shaft.

7. The rear snowmobile suspension of claim 6, wherein a first of the pair of bevel gears is in contact with a drive shaft, and wherein a second of the pair of bevel gears is in contact with an axle.

8. The rear snowmobile suspension of claim 7, wherein the axle rotates at least a drive sprocket for moving a continuous track of the snowmobile.

9. The rear snowmobile suspension of claim 1, further comprising:
   a first pair of opposing bogie wheels affixed to a first bogie wheel shaft extending through the front portion of the frame;
   a second pair of opposing bogie wheels affixed to a second bogie wheel shaft extending through the rear portion of the frame; and
   a pair of opposing rear bogie wheels, each respectively extending from an end of the first and second fixed rails at the rear portion of the frame.

10. The rear snowmobile suspension of claim 9, wherein a continuous track of the snowmobile is positioned around at least a drive sprocket on a front portion of the rear snowmobile suspension, the first and second pair of bogie wheels, and the pair of opposing rear bogie wheels.

11. The rear snowmobile suspension of claim 10, wherein each of the first and second pair of opposing bogie wheels are spring biased in a direction towards a portion of the continuous track in contact with each of the pairs of opposing bogie wheels.

12. The rear snowmobile suspension of claim 1, wherein the pair of rear swing arms, the front swing arm and the front drive arm are capable of pivoting about respective first ends in a forward direction from a substantially 90 degree position to about a 0 degree position.

13. A rear snowmobile suspension comprising:
   a pair of rear swing arms pivotably connected on respective first ends to a rear portion of a frame, one on each of a first and a second fixed rail;
   a front swing arm pivotably connected on a first end to a front portion of the frame on the first fixed rail; and
   a front drive arm housing a pinion shaft and a pair of bevel gears, each on an end of the pinion shaft, pivotably connected on a first end to a front portion of the frame on the second fixed rail, opposing the front swing arm;
   wherein a first of the pair of bevel gears is in contact with a first end of a drive shaft, and wherein a second of the pair of bevel gears is in contact with an axle.

14. The rear snowmobile suspension of claim 13, wherein the axle rotates at least a drive sprocket for moving a continuous track of the snowmobile.

15. The rear snowmobile suspension of claim 13, wherein the drive shaft extends through a second end of the front swing arm and engages a driven gear adjacent to the front swing arm.

16. The rear snowmobile suspension of claim 15, further comprising an engine having a driver gear, wherein the driver gear transfers rotational energy to the driven gear via a belt.

17. The rear snowmobile suspension of claim 16, wherein the engine is moveably connected to at least a portion of the rear snowmobile suspension.

18. A rear snowmobile suspension comprising:
   a pair of rear swing arms pivotably connected on respective first ends to a rear portion of a frame, one on each of a first and a second fixed rail;
   a front swing arm pivotably connected on a first end to a front portion of the frame on the first fixed rail;
   a front drive arm housing a pinion shaft and a pair of bevel gears, each on an end of the pinion shaft, pivotably connected on a first end to a front portion of the frame on the second fixed rail, opposing the front swing arm;
   a drive shaft having a first end in contact with a first of the pair of bevel gears; and
   an axle in contact with a second of the pair of bevel gears via a plurality of gears in a gear box;
   wherein the axle rotates at least a drive sprocket for moving a continuous track of the snowmobile, and wherein the drive shaft extends through a second end of the front swing arm and engages a driven gear adjacent to the front swing arm.

19. The rear snowmobile suspension of claim 18, further comprising:
   a first pair of opposing bogie wheels affixed to a first bogie wheel shaft extending through the front portion of the frame;
   a second pair of opposing bogie wheels affixed to a second bogie wheel shaft extending through the rear portion of the frame; and
   a pair of opposing rear bogie wheels, each respectively extending from an end of the first and second fixed rails at the rear portion of the frame.

20. The rear snowmobile suspension of claim 19, wherein a continuous track of the snowmobile is positioned around at least a drive sprocket on a front portion of the rear snowmobile suspension, the first and second pair of bogie wheels, and the pair of opposing rear bogie wheels.

* * * * *